US008225925B2

(12) United States Patent
Bassani (10) Patent No.: US 8,225,925 B2
(45) Date of Patent: Jul. 24, 2012

(54) DISCRETE ARTICLE SPACING APPARATUS FOR VIBRATION TRAYS

(75) Inventor: Loris Bassani, Montreal (CA)

(73) Assignee: Countlab Inc., Montreal, Quebec (CA)

( * ) Notice: Subject to any disclaimer, the term of this patent is extended or adjusted under 35 U.S.C. 154(b) by 309 days.

(21) Appl. No.: 12/628,740

(22) Filed: Dec. 1, 2009

(65) Prior Publication Data

US 2010/0133066 A1 Jun. 3, 2010

Related U.S. Application Data

(60) Provisional application No. 61/119,096, filed on Dec. 2, 2008.

(51) Int. Cl.
*B65G 27/06* (2006.01)
(52) U.S. Cl. ..................................... 198/758; 198/752.1
(58) Field of Classification Search .................. 198/758, 198/461.1, 461.2, 460.1, 752.1; 193/25 FT
See application file for complete search history.

(56) References Cited

U.S. PATENT DOCUMENTS

| | | | |
|---|---|---|---|
| 1,383,623 A | 7/1921 | Groves | |
| 2,845,759 A | 8/1958 | Cote et al. | |
| 3,028,713 A | 4/1962 | Kennedy et al. | |
| 3,081,588 A | 3/1963 | Klapes et al. | |
| 3,139,713 A | 7/1964 | Merrill et al. | |
| 3,677,437 A | 7/1972 | Haigler | |
| 3,746,211 A | 7/1973 | Burgess, Jr. | |
| 3,917,050 A | 11/1975 | Gregor | |
| 3,925,960 A | 12/1975 | Saari et al. | |
| 4,118,878 A | 10/1978 | Semon | |
| 4,146,123 A * | 3/1979 | Cottrell | 198/758 |
| 4,408,295 A | 10/1983 | Kavage et al. | |
| 4,461,363 A | 7/1984 | Loy | |
| 4,680,464 A | 7/1987 | Bross | |
| 4,922,181 A | 5/1990 | Pullan | |
| 4,924,955 A | 5/1990 | Dauge | |
| 4,932,559 A | 6/1990 | Stein | |
| 4,943,227 A | 7/1990 | Facchini | |
| 5,200,013 A | 4/1993 | Traber | |
| 5,238,124 A | 8/1993 | Cane et al. | |
| 5,333,778 A | 8/1994 | Specker | |
| 5,439,036 A | 8/1995 | Kramer | |
| 5,463,839 A | 11/1995 | Stange et al. | |
| 5,489,019 A * | 2/1996 | DiNanno et al. | 198/752.1 |

(Continued)

FOREIGN PATENT DOCUMENTS

CA 2060784 A1 8/1992

(Continued)

OTHER PUBLICATIONS

International Search Report issued for PCT/CA2007/000238, dated Oct. 23, 2007 (6 pages).

(Continued)

*Primary Examiner* — James R Bidwell (57) ABSTRACT

A container filling machine comprising a vibration tray that is suitable for moving discrete articles from a discrete article receiving end of the vibration tray towards a plurality of guiding paths that lead to a container. The container filling machine further comprises at least one spacing device located in proximity to the vibration tray. The at least one spacing device is operative for receiving the discrete articles from the vibration tray at a first speed, and causing the discrete articles to be deposited into the plurality of guiding paths at a second speed. The second speed is greater than the first speed.

18 Claims, 7 Drawing Sheets

U.S. PATENT DOCUMENTS

| | | | |
|---|---|---|---|
| 5,558,199 A * | 9/1996 | Roether et al. | 198/461.2 |
| 5,585,732 A | 12/1996 | Steele et al. | |
| 5,596,865 A | 1/1997 | Kramer | |
| 5,737,902 A | 4/1998 | Aylward | |
| 5,931,286 A | 8/1999 | Illi | |
| 5,950,404 A | 9/1999 | Meyer et al. | |
| 6,185,901 B1 | 2/2001 | Aylward | |
| 6,266,946 B1 | 7/2001 | Aylward | |
| 6,269,612 B1 | 8/2001 | Aylward | |
| 6,401,429 B2 | 6/2002 | Aylward | |
| 6,494,022 B1 | 12/2002 | Aylward | |
| 6,504,387 B1 | 1/2003 | Shail et al. | |
| 6,505,460 B2 | 1/2003 | Aylward | |
| 6,625,955 B2 | 9/2003 | Aylward | |
| 6,631,799 B2 * | 10/2003 | Samson | 198/758 |
| 6,640,842 B1 | 11/2003 | Laukenmann et al. | |
| 6,681,550 B1 | 1/2004 | Aylward | |
| 6,755,008 B2 | 6/2004 | Schmetzer et al. | |
| 6,789,780 B2 | 9/2004 | Pieri | |
| 6,799,413 B2 | 10/2004 | Aylward | |
| 6,925,782 B2 | 8/2005 | Aylward | |
| 6,929,115 B2 | 8/2005 | Monti | |
| 6,932,210 B2 | 8/2005 | Kramer | |
| 6,971,216 B2 | 12/2005 | Monti | |
| 7,007,821 B2 | 3/2006 | Aylward | |
| 7,012,242 B2 | 3/2006 | Tarozzi et al. | |
| 7,025,207 B2 | 4/2006 | Breu et al. | |
| 7,066,350 B2 | 6/2006 | Aylward | |
| 7,086,522 B2 * | 8/2006 | Schmidt | 198/758 |
| 7,107,741 B2 | 9/2006 | Monti | |
| 7,121,410 B2 | 10/2006 | Rohrmus et al. | |
| 7,124,912 B2 | 10/2006 | Aylward | |
| 7,128,100 B2 | 10/2006 | Monti | |
| 7,331,540 B2 | 2/2008 | Klaumunzner | |
| 2001/0045081 A1 | 11/2001 | Aylward | |
| 2002/0023414 A1 | 2/2002 | Aylward | |
| 2002/0108356 A1 | 8/2002 | Aylward | |
| 2002/0166790 A1 | 11/2002 | Aylward | |
| 2002/0194815 A1 | 12/2002 | Aylward et al. | |
| 2004/0007442 A1 | 1/2004 | Monti | |
| 2004/0035878 A1 | 2/2004 | Aylward | |
| 2004/0123560 A1 | 7/2004 | Monti | |
| 2004/0123561 A1 | 7/2004 | Monti | |
| 2004/0128955 A1 | 7/2004 | Aylward | |
| 2004/0139695 A1 | 7/2004 | Monti | |
| 2005/0000192 A1 | 1/2005 | Aylward | |
| 2005/0007588 A1 | 1/2005 | Tarozzi et al. | |
| 2005/0077313 A1 | 4/2005 | Aylward | |
| 2005/0189373 A1 | 9/2005 | Aylward | |
| 2005/0217208 A1 | 10/2005 | Cicognani | |
| 2005/0230001 A1 | 10/2005 | Monti | |

FOREIGN PATENT DOCUMENTS

| | | |
|---|---|---|
| CA | 2321725 A1 | 9/1999 |
| DE | 4118878 A1 | 1/1993 |
| DE | 4331879 A1 | 3/1994 |
| DE | 202004008975 U1 | 8/2004 |
| DE | 102004027590 B3 | 11/2005 |
| EP | 0259354 A1 | 3/1988 |
| EP | 0347392 A1 | 12/1989 |
| EP | 0360765 A1 | 3/1990 |
| EP | 0486439 A1 | 5/1992 |
| EP | 0491658 A1 | 6/1992 |
| EP | 0499577 A1 | 8/1992 |
| EP | 0561737 A1 | 9/1993 |
| EP | 0588838 A1 | 3/1994 |
| EP | 0588993 A1 | 3/1994 |
| EP | 0618447 A2 | 10/1994 |
| EP | 0630816 A2 | 12/1994 |
| EP | 0639528 A1 | 2/1995 |
| EP | 0677482 A1 | 10/1995 |
| EP | 0770554 A1 | 5/1997 |
| EP | 0816235 A1 | 1/1998 |
| EP | 0932554 A1 | 8/1999 |
| EP | 1041022 A1 | 10/2000 |
| EP | 1043252 A1 | 10/2000 |
| EP | 1052202 A1 | 11/2000 |
| EP | 1060362 A1 | 12/2000 |
| EP | 1061361 A1 | 12/2000 |
| EP | 1106511 A1 | 6/2001 |
| EP | 1171347 A1 | 1/2002 |
| EP | 1221410 A2 | 7/2002 |
| EP | 1251073 A1 | 10/2002 |
| EP | 1253095 A1 | 10/2002 |
| EP | 1270441 A1 | 1/2003 |
| EP | 1380510 A1 | 1/2004 |
| EP | 1389583 A1 | 2/2004 |
| EP | 1391386 A2 | 2/2004 |
| EP | 1395500 A1 | 3/2004 |
| EP | 1413517 A1 | 4/2004 |
| EP | 1431180 A1 | 6/2004 |
| EP | 1431181 A1 | 6/2004 |
| EP | 1431182 A2 | 6/2004 |
| EP | 1471993 A1 | 11/2004 |
| EP | 1481913 A1 | 12/2004 |
| EP | 1588944 A1 | 10/2005 |
| EP | 1602593 A1 | 12/2005 |
| GB | 2270771 A | 3/1994 |
| GB | 2310729 A | 9/1997 |
| GB | 2326488 A | 12/1998 |
| JP | 1210200 A | 8/1989 |
| JP | 4352669 A | 12/1992 |
| JP | 5228447 A | 9/1993 |
| JP | 6032347 A | 2/1994 |
| JP | 2000079912 A | 3/2000 |
| JP | 2002249103 A | 9/2002 |
| WO | WO-87/04407 A1 | 7/1987 |
| WO | WO-92/22278 A1 | 12/1992 |
| WO | WO-92/22401 A1 | 12/1992 |
| WO | WO-95/09452 A1 | 4/1995 |
| WO | WO-95/25333 A1 | 9/1995 |
| WO | WO-96/25333 A1 | 8/1996 |
| WO | WO-96/26873 A1 | 9/1996 |
| WO | WO-97/01489 A1 | 1/1997 |
| WO | WO-97/06061 A1 | 2/1997 |
| WO | WO-97/19010 A1 | 5/1997 |
| WO | WO-98/15461 A1 | 4/1998 |
| WO | WO-98/57144 A1 | 12/1998 |
| WO | WO-99/45343 A1 | 9/1999 |
| WO | WO-99/62699 A1 | 12/1999 |
| WO | WO-00/64744 A1 | 11/2000 |
| WO | WO-02/100736 A1 | 12/2002 |
| WO | WO-03/097459 A2 | 11/2003 |
| WO | WO-2005/023672 A1 | 3/2005 |

OTHER PUBLICATIONS

Landon IP Patent Search Report, dated Mar. 28, 2006 (14 pages).

* cited by examiner

DISCRETE ARTICLE SPACING APPARATUS FOR VIBRATION TRAYS

CROSS REFERENCE TO RELATED APPLICATIONS

This application claims the benefit under 35 USC §119(e) of U.S. provisional patent application Ser. No. 61/119,096 filed Dec. 2, 2008. The contents of the above-mentioned patent application are incorporated herein by reference.

FIELD OF THE INVENTION

The present invention relates generally to container filling machines, and more specifically to vibration trays that comprise at least one spacing device.

BACKGROUND OF THE INVENTION

Container filling machines for filling containers with discrete articles (such as pharmaceutical pills, cosmetic items, hardware components, candies, nuts, etc. . . . ) are known in the art. Such container filling machines are able to take a large supply of discrete articles and transport them towards a container, while ensuring that a desired number of the discrete articles are placed within the container. However, existing container filling machines are plagued with numerous deficiencies that often render them ineffective and inefficient.

Existing container filling machines for placing discrete articles within containers typically use a vibration tray in order to space the discrete articles from each other and move the discrete articles towards multiple paths that ultimately lead towards the containers. However, the speed at which such vibration trays can move the discrete articles forward is generally quite limited. In addition, the discrete articles that leave the vibration trays are often very closely packed together, which makes them difficult to count. This lack of speed, and inability to accurately separate the discrete articles, makes the container filling machine less efficient and potentially less accurate than it could be.

In light of the above, it is clear that there is a need in the industry for an improved container filling machine that alleviates, at least in part, the deficiencies of the prior art.

SUMMARY OF THE INVENTION

In accordance with a first broad aspect, the present invention comprises a system for use in a container filling machine. The system comprises a vibration tray suitable for moving discrete articles from a discrete article receiving end of the vibration tray towards a discrete article drop-off end of the vibration tray. The system further comprises at least one spacing device located in proximity to the discrete article drop-off end. The at least one spacing device is driven at a rotation speed and is operative for receiving discrete articles from the vibration tray at a first speed and causing the discrete articles to be deposited from the vibration tray at a second speed. The second speed is greater than the first speed.

In accordance with a second broad aspect, the present invention comprises a container filling machine that comprises a vibration tray that is suitable for moving discrete articles from a discrete article receiving end of the vibration tray towards a plurality of guiding paths that lead towards a container. The container further comprises at least one spacing device located in proximity to the vibration tray. The at least one spacing device is operative for receiving the discrete articles from said vibration tray at a first speed, and causing the discrete articles to be deposited into the plurality of guiding paths at a second speed. The second speed is greater than the first speed.

In accordance with a third broad aspect, the present invention comprises a method for filling containers with discrete articles. The method comprises causing rotational motion to be provided to a first spacing device for moving discrete articles from a first vibration tray to a first set of guiding paths that lead to a first container, causing rotational motion to be provided to a second spacing device for moving discrete articles from a second vibration tray to a second set of guiding paths that lead to a second container, receiving an indication that the first container and the second container are being filled with the discrete articles at different rates and causing an adjustment in the rotational motion provided to one of the first spacing device and the second spacing device.

Other aspects and features of the present invention will become apparent to those ordinarily skilled in the art upon review of the following description of specific embodiments of the invention in conjunction with the accompanying figures.

DETAILED DESCRIPTION

Figure 1:
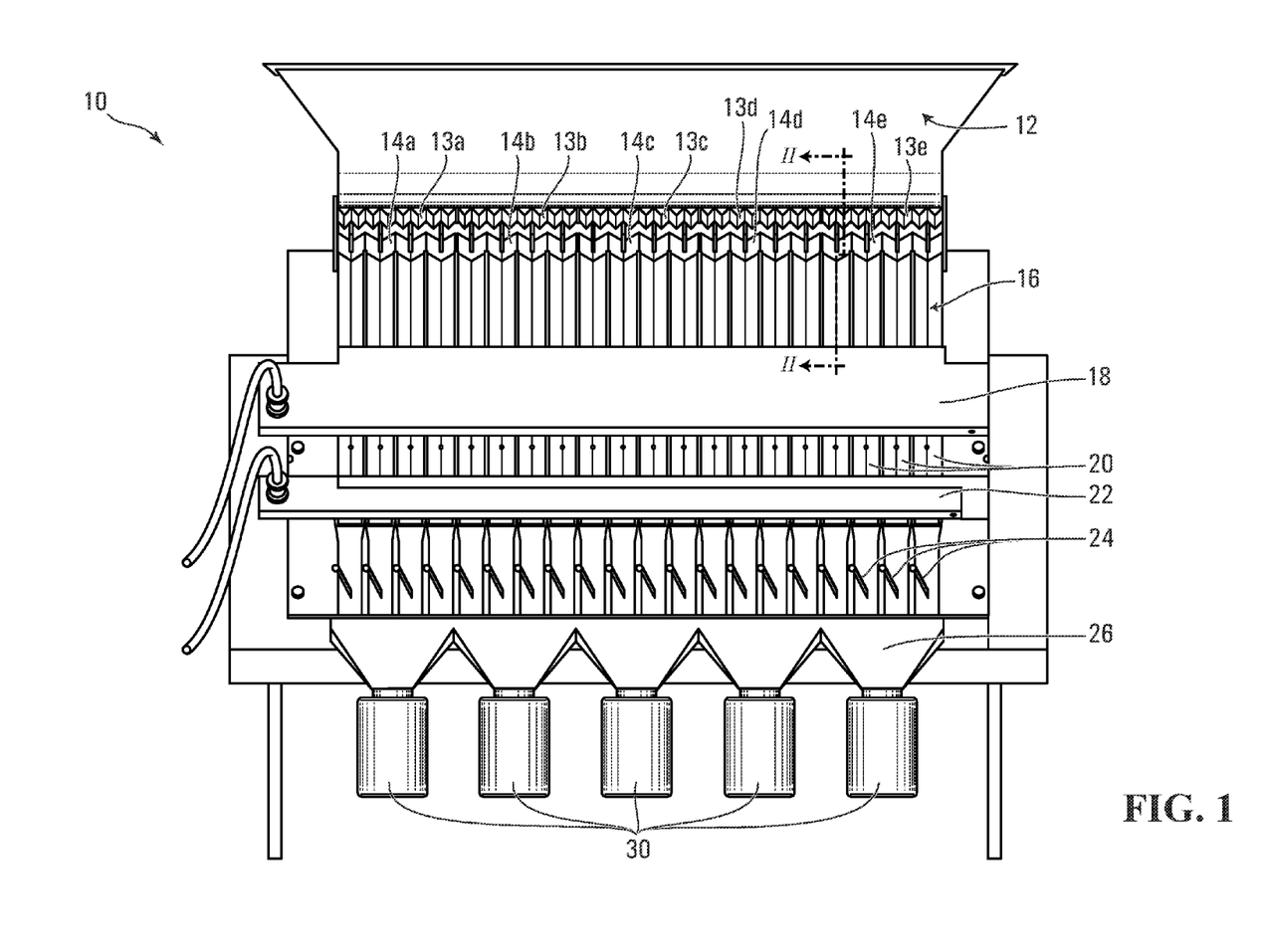
FIG. 1 shows a front plan view of a container filling machine in accordance with a non-limiting example of implementation of the present invention.

Shown in FIG. 1 is a front view of a container-filling machine 10 in accordance with a non-limiting example of implementation of the present invention. The container filling machine 10 is suitable for loading into containers any discrete articles, such as discrete articles for personal treatment (e.g. pharmaceutical pills, cosmetic items, etc.) or candies, nuts, or any other type of discrete article. As used herein, the term "discrete article for personal treatment" includes any type of pharmaceutical discrete article that can be ingested (such as pressed-powder or gel cap pills, among other possibilities) as well as any cosmetic item that can be applied to an external part of the body (such as moisturizer capsules, for example).

In the non-limiting embodiment shown, the container filling machine 10 includes a hopper 12, guiding trays 13*a*-13*e*, vibration trays 14*a-e*, a plurality of guiding paths 16, a sensing device 18, a rejection device 20, a counting device 22, a plurality of path blocking devices 24, and a set of funnels 26 for guiding the discrete articles into respective containers 30. In operation, the discrete articles that are to be put into the containers 30 are first supplied to the hopper 12 in a disorganized fashion. For example, a supply of discrete articles can simply be poured or dumped into the hopper 12 from another container. The hopper 12 then deposits the discrete articles onto the vibration trays 14a-14e via a series of guiding trays 13a-13e (best shown in FIG. 3). The guiding trays 13a-13e and the vibration trays 14a-14e vibrate in order to transport the discrete articles towards the guiding paths 16, which eventually lead the discrete articles into containers.

In accordance with the present invention, the vibration trays 14a-14e provide the discrete articles to the guiding paths 16 in a quasi-uniform, spaced-apart manner.

Once deposited onto the guiding paths 16 from the vibration trays 14a-14e, the discrete articles travel along the guiding paths 16 under the force of gravity. Or, in the case where spacing devices 46 (to be described in more detail below) are used, the discrete articles may be projected into the guiding paths 16 from the spacing devices 46 such that they travel along the guiding paths 16 at a faster speed than if they were just travelling along the paths 16 under the force of gravity. As they travel along the guiding paths 16, the discrete articles first pass through the sensing device 18, which is operative for assessing the integrity of each discrete article on an individual basis. Assessing the integrity of the discrete articles detects whether or not a discrete article is defective. An integrally formed discrete article is a non-defective discrete article that is complete and fully formed. As such, by assessing the integrity of the discrete article, the sensing device 18 is verifying whether the discrete article is chipped, broken, deformed or empty in the case of gel cap pills. The sensing device 18 may be an optical sensing device, as is known in the art, or a capacitive sensing device, as described in co-pending PCT application PCT/CA2007/000238.

In the case where a discrete article travelling through the sensing device 18 is found to be defective, the rejection device 20, which is positioned below the sensing device 18, is able to remove the defective discrete article from continued travel towards a container. In accordance with a non-limiting embodiment, the rejection device 20 uses a jet of compressed air that blows through a hole in a guiding path 16 in order to blow a defective discrete article out of its path of travel. Such a rejection device is described in more detail in co-pending application PCT/CA2007/000238.

In the case where a discrete article is not defective, it continues along its guiding path 16 towards the counting device 22. The counting device 22 is operative for counting the number of integral discrete articles that pass therethrough. The counting device 22 can include optical circuitry, or capacitive circuitry, in order to detect and generate a count of the discrete articles passing along each one of the respective guiding paths 16. A counting device 22 that is suitable for use within the container filling machine 10 is described in more detail in co-pending application PCT/CA2007/000238. On the basis of information from the counting device 22, the path blocking devices 24, which follow the counting device 22, can control the number of discrete articles that enter each container 30. In a non-limiting embodiment, the path blocking devices 24 are gates that are able to move between an open position and a closed position for blocking access to the containers 30. In the non-limiting embodiment shown, there is one path-blocking device 24 for each of the guiding paths 16.

Using the above components, the container-filling machine 10 is able to fill a plurality of containers 30 with an exact number of integral discrete articles. The path blocking devices 24 further permit the container filling machine 10 to keep a steady flow of discrete articles travelling towards the containers 30, even as filled containers 30 are being replaced by empty containers.

Once filled, the containers 30 continue towards other machines that are able to reject incorrectly filled containers 30, put caps on the containers 30, apply labels to the containers 30, and generally perform any other operation on the containers 30 that is required prior to providing the containers 30 to an end consumer.

It should be appreciated that numerous discrete articles travel through the guiding paths 16 at the same time, such that once the discrete articles are flowing through the machine, each of the functionalities described above is performed at substantially the same time. For example, while the guiding trays 13a-13e and the vibration trays 14a-14e transport certain discrete articles, the sensing device 18 may be sensing other discrete articles that are further on in their travel towards a container 30, and the counting device 22 may be counting still other discrete articles that are even further along in their travel towards a container 30. As such, these functionalities all occur simultaneously while discrete articles travel through the container-filling machine 10.

In a preferred embodiment, the functionality of the components of the container filling machine 10 (i.e. the functionality of the guiding trays 13a-13e, the vibration trays 14a-14e, the sensing device 18, the rejection device 20, the counting device 22 and the path blocking devices 24) are controlled via one or more computing units that include at least one software driven processing unit. However, in some embodiments of the invention, all or part of the functionality of these components may be implemented as pre-programmed hardware or firmware elements (e.g., application specific integrated circuits (ASICs), electrically erasable programmable read-only memories (EEPROMs), etc.) or other related components.

The guiding trays 13a-13e and the vibration trays 14a-14e will now be described in more detail herein.

As described above, the hopper 12 is operative for receiving an initial load of discrete articles, and for releasing those discrete articles onto the plurality of guiding trays 13a-13e, which in turn, supply those discrete articles onto the vibration trays 14a-14e. The initial load of discrete articles can be placed into the hopper 12 in a quick manner, such as by pouring or dumping the discrete articles at an intake end of the hopper. The discrete articles do not need to be provided to the hopper 12 in any particular order or orientation, and as such can be quickly poured into the hopper 12. This can be done either manually by an operator of the container-filling machine 10, or mechanically by a different machine.

Although not shown in the Figures, the back portion of the hopper 12 can include an adjustable gate portion such that the output through which the discrete articles exit the hopper 12 onto the guiding trays 13a-13e can be adjusted in size. For example, the adjustable gate portion can adjust the size of the output to make it smaller or larger in order to facilitate the depositing of discrete articles of different sizes onto the guiding trays 13a-13e.

The guiding trays 13a-13e receive the discrete articles from the hopper 12 and transfer the discrete articles onto the vibration trays 14a-14e. In accordance with the non-limiting example of implementation shown in the Figures, and as will be described herein, the container-filling machine 10 of the present invention includes five guiding trays 13a-13e and five vibration trays 14a-14e. More specifically, the container-filling machine 10 of the present invention includes one guiding tray and one vibration tray for each of the containers 30 to be filled. As such, there is a one-to-one ratio of guiding trays 13a-13e and vibration trays 14a-14e to containers 30. It should, however, be appreciated that any number of guiding trays and vibration trays could be used without departing from the spirit of the invention.

Figure 2:
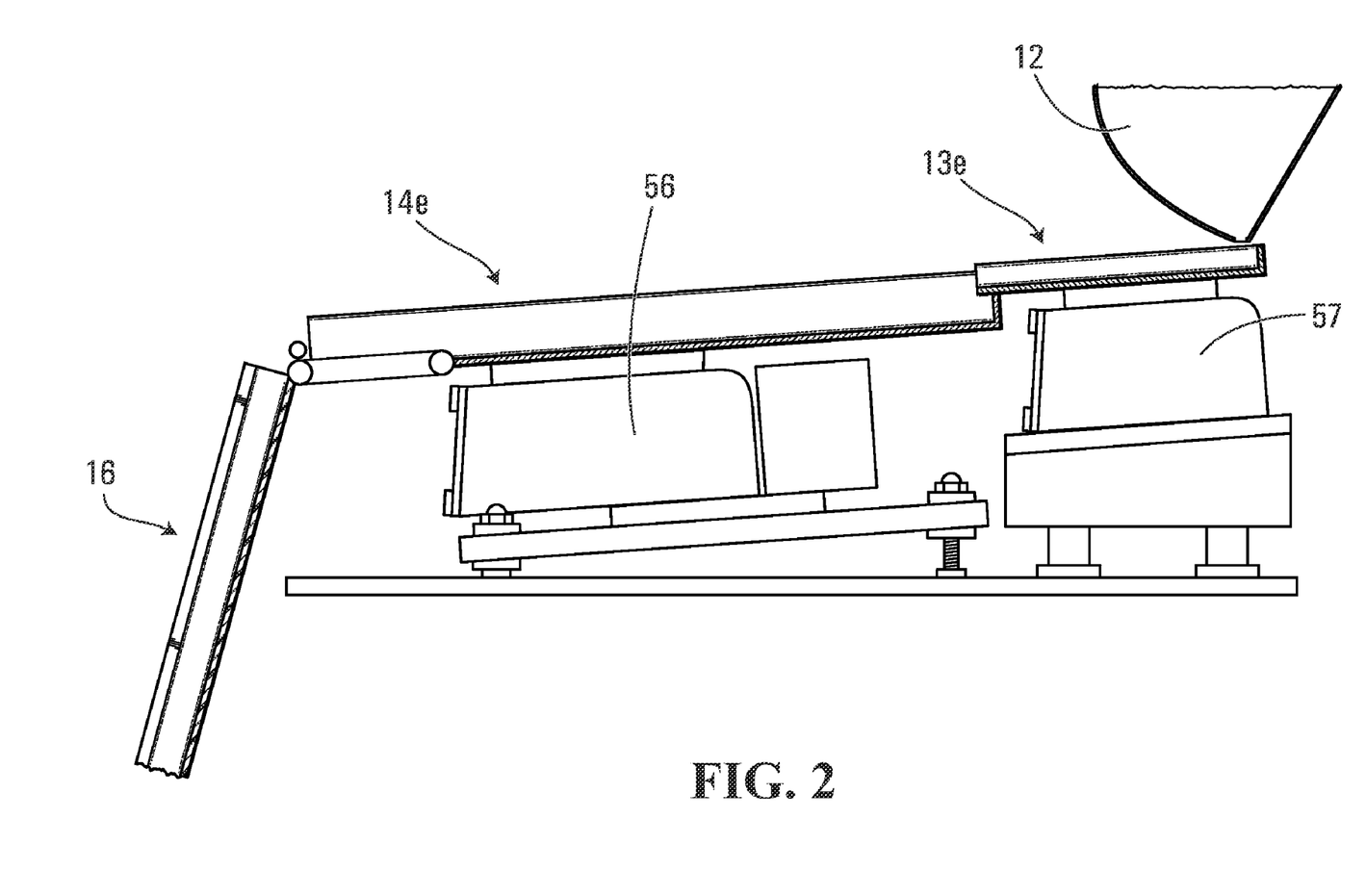
FIG. 2 shows a side representational view of the upper portion of the container filling machine of FIG. 1.

As shown in FIG. 2, positioned beneath the guiding trays 13a-13e are drive units 57 and positioned beneath vibration trays 14a-14e are drive units 56. As such, although not shown in FIG. 2, there are a total of five drive units 57, with one drive unit 57 positioned beneath each one of the five guiding trays 13a-13e respectively, and a total of five drive units 56, with one drive unit 56 positioned beneath each one of vibration trays 14a-14e. As such, in accordance with the present invention, each of the guiding trays 13a-13e is in communication with a separate drive unit 57 and each of vibration trays 14a-14e is in communication with a separate drive unit 56, such that the vibration of each guiding tray 13a-13e and each vibration tray 14a-14e can be controlled independently. These drive units 56 and 57 can be either electromagnetic drive units, pneumatic drive units or mechanical drive units, among other possibilities. The drive units 56 and 57 are attached to spring systems (not shown), and/or resilient plates (not shown) for transmitting vibration from the drive units 57, 56 to the guiding trays 13a-13e and vibration trays 14a-14e. The control of the guiding trays 13a-13e and the vibration trays 14a-14e will be described in more detail below.

Figure 3:
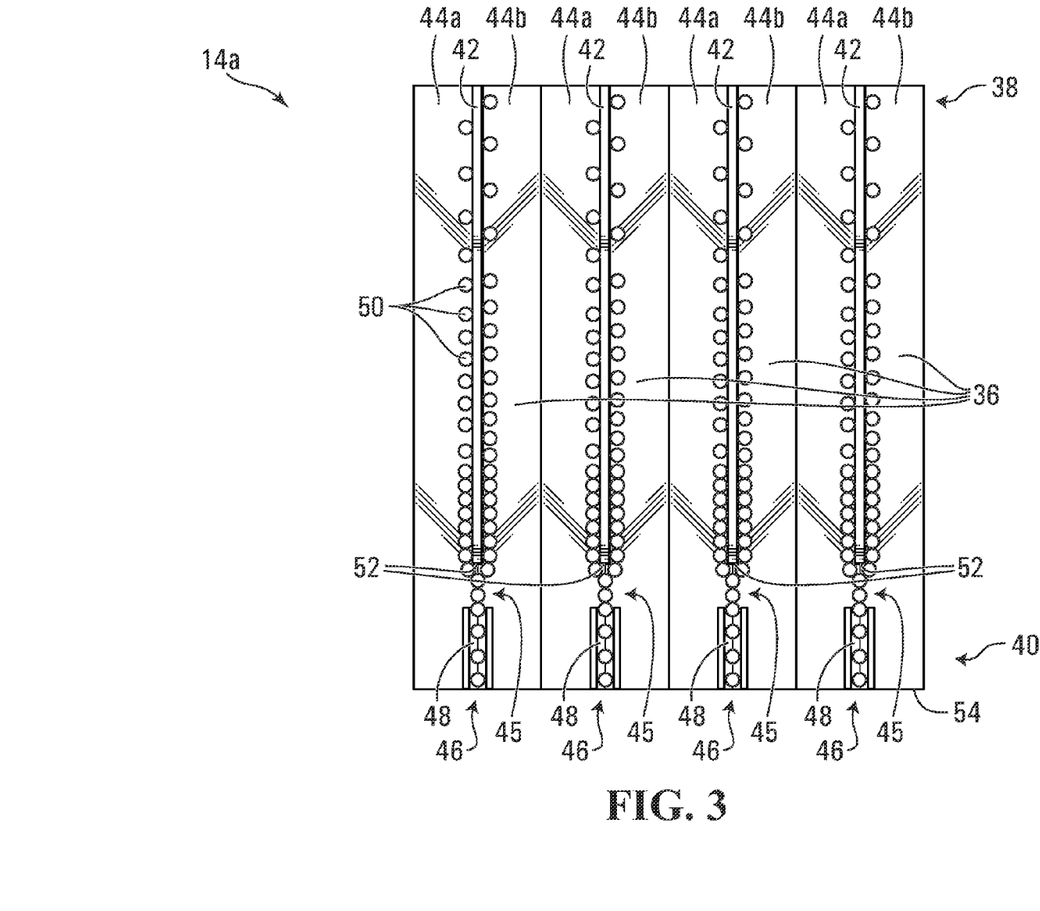
FIG. 3 shows a top plan view of a vibration tray in accordance with a non-limiting example of implementation of the present invention.

Shown in FIG. 3 is vibration tray 14a, which has been shown separately from vibration trays 14b-14e for the sake of simplicity. Vibration trays 14b-14e are substantially the same as vibration tray 14a, and as such, anything described herein with respect to vibration tray 14a is also applicable to vibration trays 14b-14e.

Figure 4:
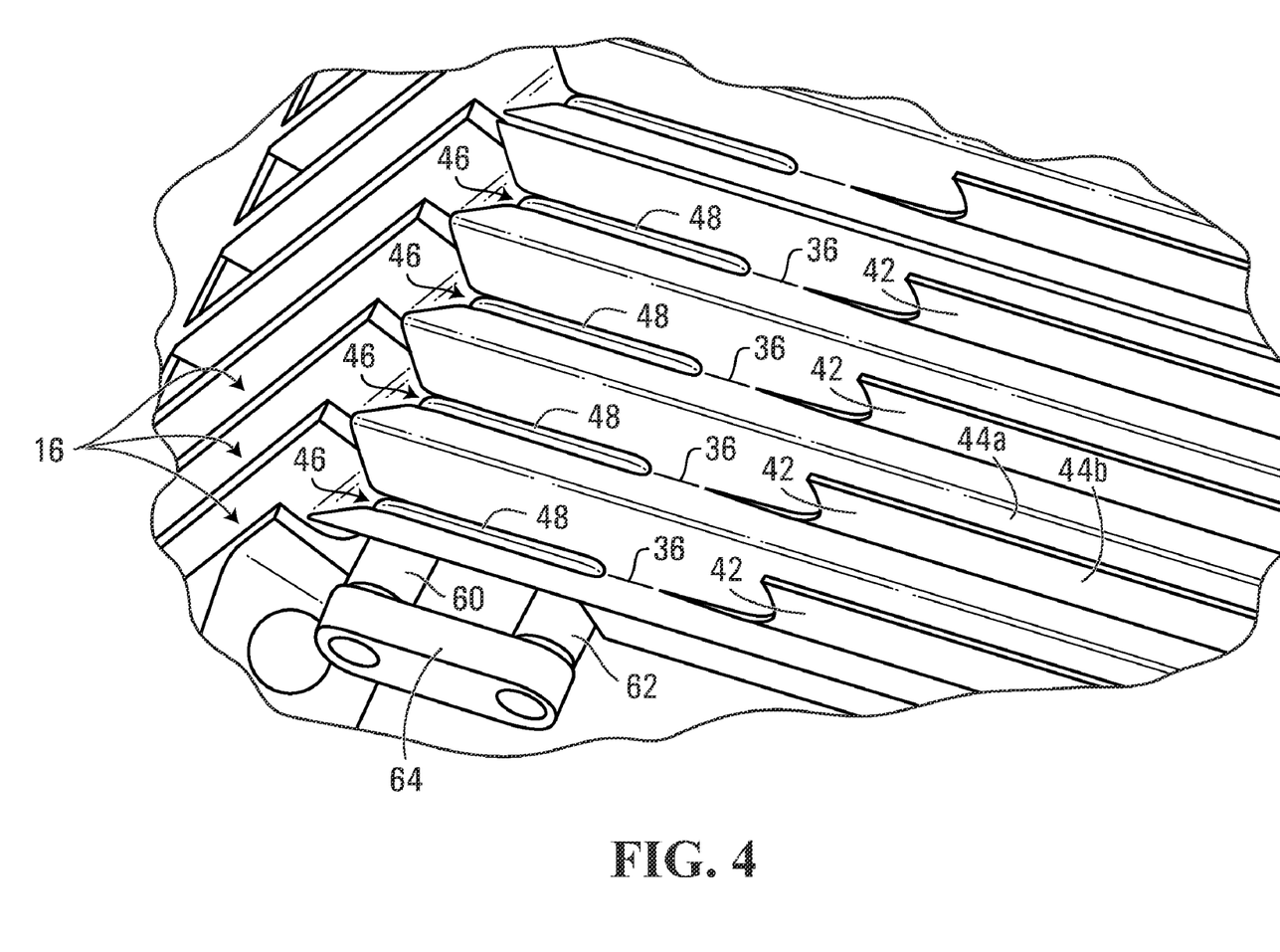
FIG. 4 shows a top perspective view of a vibration tray in accordance with a non-limiting example of implementation of the present invention.

In the non-limiting example shown in FIG. 3, vibration tray 14a includes a discrete article receiving end 38, a discrete article drop-off end 40 and four channels 36 extending from the discrete article receiving end 38 to the discrete article drop off end 40. As best shown in FIG. 4, in accordance with the non-limiting embodiment shown, the four channels 36 are each substantially V-shaped. The V-shape of the channels helps to position the discrete articles into rows of discrete articles that can be easily supplied to the guiding paths 16. In addition, the V-shape of the channels also helps to orient the discrete articles into a good position for passing through the sensing apparatus 18.

As shown in FIG. 2, the vibration trays 14a-14e are positioned substantially horizontally, with a slight downward incline towards the guiding pathways 16. As such, the vibration of the vibration trays 14a-14e causes the discrete articles 50 that are deposited onto the discrete article receiving end 38 to move towards the discrete article drop-off end 40 of the trays 14a-14e. As shown in FIGS. 3 and 4, positioned within each of the channels 36 in proximity to the discrete article drop off end 40, is a spacing device 46. The spacing devices 46 are operative for providing the discrete articles to the guiding paths 16 in a quasi-uniform, spaced-apart manner.

In the embodiment shown, the spacing devices 46 within each of the respective channels 36 are operative for providing the discrete articles to a respective one of the guiding paths 16. Given that each of the five vibration trays 14a-14e includes four channels 36, the container filling machine 10 comprises a total of twenty channels 36, with each channel 36 leading into a respective one of the guiding paths 16. As such, in the non-limiting embodiment shown, there is a one-to-one ratio between channels 36 and guiding paths 16. It should be appreciated that in an alternative embodiment, each of the vibration trays 14a-14e could include any number of channels 36 without departing from the spirit of the invention. In addition, two or more of the channels 36 could supply discrete articles 50 to a single guiding path 16. As such, it is not required that there be a one-to-one ratio of channels 36 to guiding paths 16.

As best shown in FIG. 4, the four channels 36 within vibration tray 14a are V-shaped channels. It should, however, be appreciated that other shapes of channels are also included within the scope of the present invention. For example, the channels 36 may be U shaped, or have flat bottoms, among other possibilities.

In accordance with the present invention, each of the channels 36 includes a wall-portion 42 that extends along a longitudinal length of the channel for dividing the channel 36 into a first side and a second side. As such, the wall portion 42 creates two discrete article receiving paths 44a and 44b within each channel 36. In the non-limiting embodiment shown, the wall portions 42 divide the channels 36 in half, such that the two discrete article receiving paths 44a and 44b are of equal size. However, in an alternative embodiment, the two discrete article receiving paths 44a and 44b could be of differing sizes.

The wall portions 42 can be of any height suitable for dividing the channels 36 into the two discrete article receiving paths 44a and 44b. For example, the height of the wall portions 42 can extend above, below, or to the same height as the upper edges of the channels 36.

At a location in proximity to the discrete article drop-off end 40, the two discrete article receiving paths 44a and 44b combine into a single discrete article depositing path 45. This discrete article depositing path 45 is the path of travel created by the channel 36 when no wall portion 42 is included therein. By including the wall portions 42 that divide the channels into two discrete article receiving paths 44a and 44b, when the discrete articles from each of these two discrete article receiving paths 44a and 44b combine together in the discrete article depositing path 45, they push each other forward which increases the speed of movement of the discrete articles. This pushing action causes acceleration in the movement of the discrete articles towards the spacing devices 46.

It should be appreciated that the wall portions 42 can be made separately from the vibration tray 14a. As such, the wall portions 42 can be affixed to the vibration tray 14a in a removable manner or in a permanent manner, at a later stage of production. For example, in the case where the wall portions 42 are removably affixed to the vibration tray 14a, they can be affixed via screws, bolts, a snap-fit arrangement or a friction fit arrangement, among other possibilities. In a non-limiting example of implementation, the wall portions 42 include tabs that are adapted for being inserted within slots in the channels 36 for maintaining the wall portions 42 in position within the channels 36. In the case where the wall portions 42 are permanently affixed to the vibration tray 14a, they can be welded, adhered or riveted in place, among other possibilities. In yet a further alternative, the wall portions 42 can be integrally formed with the vibration tray 14a, such that the arrangement of the tray 14a and the four wall portions 42 are formed as one piece. In this manner, the tray 14a, as well as the wall portions 42 can be stamped, crimped, bent, molded or machined into the appropriate shape. In a non-limiting example of implementation, the vibration trays 14a-14e including the wall portions 42 can be machined out of an aluminum material.

As shown in FIG. 4, the wall portions 42 extend from the discrete article-receiving end 38 of the tray 14a towards the discrete article drop-off end 40 of the tray. However, the wall portions 42 do not extend all the way to the end of the discrete article drop-off end 40. As such, the two discrete article receiving paths 44a and 44b are able to merge into the single path formed by each of the channels 36. As will be described in more detail below, within each of the channels 36 is a spacing device 46 for receiving the discrete articles 50 and transporting them from the vibration tray 14a to a respective one of the guiding paths 16.

In operation, the discrete articles 50 are deposited onto the trays 14a-14e at the discrete article-receiving end 38 of the trays 14a-14e. More specifically, the discrete articles 50 exit the hopper 12 onto guiding trays 13a-13e that, in turn, place the discrete articles 50 into the discrete article receiving paths 44a and 44b of the vibration trays 14a-14e. As such, in the embodiment shown, the guiding trays 13a-13e include forty paths that direct the discrete articles into the two paths 44a and 44b of each of the twenty channels 36 of the vibration trays 14a-14e. In the embodiment shown, the guiding trays 13a-13e are slopped V-shaped channels that direct and position the discrete articles 50 from the hopper 12 into the discrete article receiving paths 44a and 44b of the vibration trays 14a-14e.

As shown in FIG. 3, once the discrete articles 50 have been deposited within the two discrete article receiving paths 44a and 44b of each channel 36, the vibration of the vibration tray 14a causes the discrete articles 50 to move towards the discrete article drop-off end 40. As the discrete articles 50 travel towards the discrete article drop-off end 40, they begin to move more closely together, as depicted in FIG. 3. As such, when the discrete articles 50 have reached the wall termination 52 of the wall portions 42, the discrete articles 50 are tightly packed such that they push each other into the discrete article depositing path 45 created by each channel 36. This merging of the two discrete article receiving paths 44a and 44b causes acceleration in the speed of travel of the discrete articles within the discrete article depositing path 45.

More specifically, as the two streams of discrete articles 50 (namely the stream in the first discrete article receiving path 44a and the stream in the second discrete article receiving path 44b) meet at the wall termination 52, the two streams merge into the single discrete article depositing path 45 created by the channel 36. This merging causes the discrete articles 50 in the two discrete article-receiving paths 44a and 44b to push the subsequent discrete articles 50 in the discrete article depositing path 45 forwards. As such, due to this forced pressure, the discrete articles 50 within the discrete article depositing path 45 move more quickly than the discrete articles 50 in the two discrete article receiving paths 44a and 44b.

As shown in FIGS. 3 and 4, positioned within each of the channels 36 at the discrete article drop off end 40 are spacing devices 46. The spacing devices 46 are operative for receiving the discrete articles that have merged into the discrete article depositing paths 45 of the channels 36 from the two receiving paths 44a and 44b, and for transporting them from vibration tray 14a to the guiding paths 16. In this manner it is the spacing devices 46 that supply the discrete articles 50 to the guiding paths 16.

Figure 5:
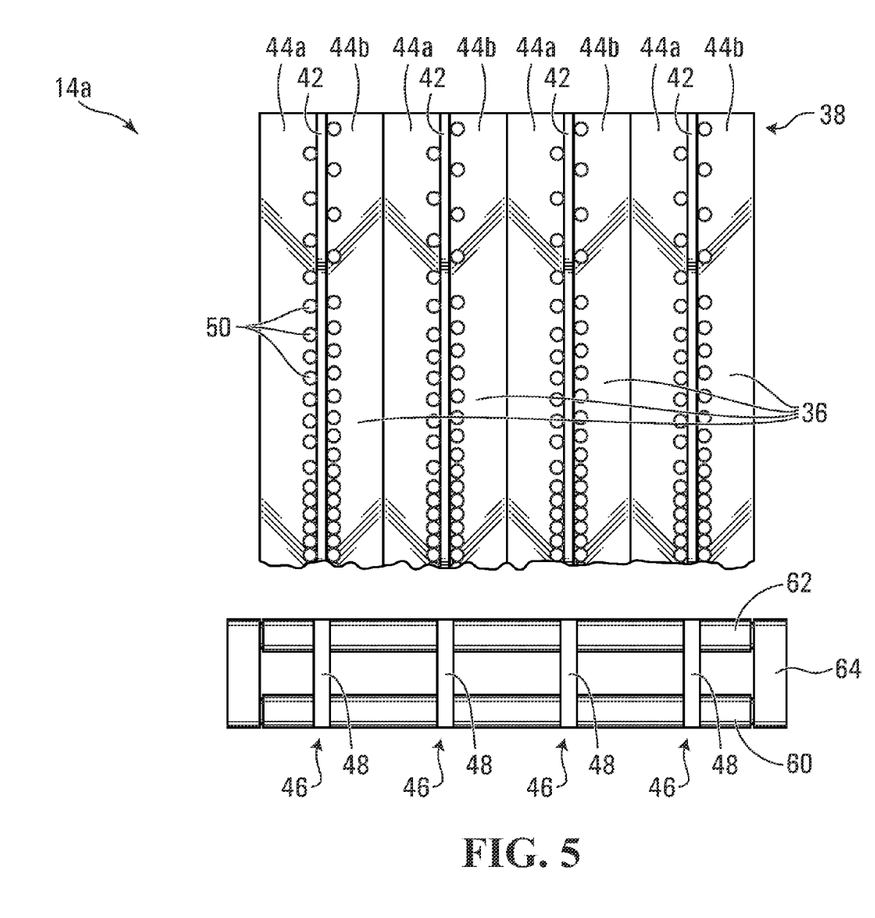
FIG. 5 shows a top plan view of the vibration tray of FIG. 3 with a portion of the vibration tray cut-away.

In accordance with a non-limiting example of implementation of the present invention, the spacing devices 46 each comprise a belt 48 that is positioned around a driving shaft 60 and a driven shaft 62. FIG. 5 shows the spacing devices 46 positioned underneath the vibration tray 14a, with a portion of the vibration tray 14a cut-away such that the spacing devices 46 can be seen clearly. As shown in FIG. 5, the driving shaft 60 and the driven shaft 62 can be common to each of the spacing devices 46 for a given vibration tray, such as vibration tray 14a. Alternatively, the driving shaft 60 and the driven shaft 62 can be common to all of the spacing devices in all of the trays 14a-14e.

The driving shaft 60 and the driven shaft 62 are positioned beneath the vibration trays 14a-14e in proximity to the discrete article drop off end 40. In the embodiments shown, the belts 48 of the spacing devices 46 terminate at approximately the place at the terminating end 54 of the vibration trays 14a-14e. The belts 48 are positioned around a driving shaft 60 and a driven shaft 62, such that the driving shaft 60 can impart rotational motion to the belts 48. The belts 48 are spaced apart on the shafts 60 and 62 such that each belt 48 fits within a slot at the base of each channel 36 in the discrete article depositing paths 45 of the vibration trays 14a-14e. The slots within each channel 36 extend all the way to the terminating end 54 of each channel 36 and the belts 48 fit just beneath, or flush with, the base of each channel 36 within the slots.

In accordance with a non-limiting embodiment, the belts 48 can be O-rings, rubber conveyor belts, chain belts, or any other suitable type of belt for transporting the discrete articles 50. The belts 48 are generally made of a material that provides sufficient friction for picking up the discrete articles 50, and transporting them towards the guiding paths 16 which are located after the discrete article drop-off end 40 of the vibration tray 14a. For example, the belts 48 can be made of rubber, polyurethane, plastic, or any other suitable material. Alternatively, the belts can be made of a metallic material (such as in the case of a chain) that provides recesses or other mechanical depressions (such as the holes within a chain link, for example) for carrying respective ones of the discrete articles. In the case where the belts 48 comprise recesses or depressions, they may not need to be made of a material that provides frictional engagement with the discrete articles, since it is the recesses and/or depressions that will cause the discrete articles 50 to be carried by the belts 48. The type of belt 48 that is used can be chosen on the basis of the types of discrete articles that are being processed by the machine 10, and it should be appreciated that a person of skill in the art would be able to chose a belt that suits the application.

In the embodiment shown in FIG. 5, the driving shaft 60 is connected to a motor 64, such that rotation is imparted to the driving shaft 60. This rotation causes the belts 48 to rotate, which in turn cause the driven shaft 62 to rotate. In the embodiment shown, the motor 64 is connected to the two shafts 60 and 62 for imparting rotation to the driving shaft 60 and for providing support for the driven shaft 62. In the embodiment shown in FIG. 4, rotation is imparted to the driving shaft 60 in a counter-clockwise direction (when viewed from the right-side of the machine), such that the belts 48 rotate in a direction that carries the discrete articles 50 towards the guiding paths 16.

The motor 64 that causes the driving shaft 60 to rotate is in communication with a processing unit (not shown) that is in communication with a motor 64 for controlling the speed of rotation of the driving shaft 60, and thus the speed of rotation of the belts 48. In accordance with a non-limiting embodiment, the belts 48 are operative to rotate at between 150-600 rpm. Depending on the size of the bets, this rotation speed may translate to a translational speed of 10 m/min to 30 m/min for carrying the discrete articles. However, it should be appreciated that this speed may also be greater or lesser than these speeds without departing from the spirit of the invention.

The processing unit can control the speed of rotation of the driving shaft 60 such that the speed of rotation remains at a substantially constant speed throughout a container filling operation. This substantially constant speed could be specified by an operator of the container filling machine, and could be set differently for different types of discrete articles. Alternatively, the processing unit may control the speed of rotation of the driving shaft 60 in a dynamic manner, such that the speed of rotation will be adjusted on the basis of different factors, such as the frequency of vibration of the vibration trays 14a-14e, or the speed at which a container 30 is being filled. This will be described in more detail below.

In an alternative embodiment, instead of the spacing devices 46 comprising belts 48 that are positioned around a driving shaft 60 and a driven shaft 62, the spacing devices 46 could be comprised of wheels (not shown) that comprise either a frictional surface for engaging and carrying the discrete articles, or a recessed surface that is able to receive subsequent discrete articles from the discrete article depositing paths 45. The wheels could be positioned at the same locations as the belts 48 within the vibration trays 14a-14e and be connected together via a central rotating shaft that is able to impart rotational motion to the wheels of the spacing devices. In this manner, as the wheels turn, the wheels are able to pick up and carry discrete articles from the vibration trays 14a-14e to the guiding paths 16.

The manner in which the spacing devices 46 operate in order to transport the discrete articles from the discrete article depositing paths 45 of the vibration trays 14a-14e to the termination end 54 of the vibration trays 14a-14e will now be described in more detail. During operation, the discrete articles 50 merge from each of the two receiving paths 44a and 44 into the discrete article depositing paths 45 of each channel 36. As the discrete articles 50 merge into the discrete article depositing paths 45 created by each of the channels 36, the discrete articles 50 become very close together and move at a first speed. The belts 48 of the spacing devices 46 are operative for rotating at a second speed that is faster than the first speed, such that when the discrete articles 50 come into contact with the belts 48 of the spacing devices 46, they are transported by the belts 48 at a faster speed than they were travelling within the discrete article depositing paths 45. In this manner, the belts 48 create a space between each of the discrete articles 50 that are provided to the guiding paths 16. In this manner, the discrete articles 50 that leave the belts 48 at the termination end 54 of the vibration trays 14a-14e are provided to the guiding paths 16 in a spaced apart manner. The discrete articles 50 are also provided to the guiding paths 16 at a faster rate than would be possible without the spacing devices 46, which can result in the containers 30 being filled at a faster rate.

As such, the spacing devices 46 allow the vibration trays 14a-14e to supply discrete articles 50 to the guiding paths in a spaced apart manner, at a faster rate than would be possible without the spacing devices 46. In other words, the spacing devices 46 increase the speed at which the discrete articles are supplied to the guiding paths 16.

As mentioned above, and as shown in the non-limiting embodiment of FIG. 1, each of the guiding trays 13a-13e and each of the vibration trays 14a-14e corresponds to a respective one of the containers 30 to be filled. As such, the eight paths in each of the guiding trays 13a-13e lead into four channels 36 of a corresponding vibration tray 14a-14e which, in turn, lead into four guiding paths 16 that lead into respective ones of the containers 30 to be filled. In the embodiment shown, every four guiding paths 16 leads into a respective container 30, such that the container filling machine 10 is able to simultaneously fill five containers 30.

Given that each one of the guiding trays 13a-13e and each one of the vibration trays 14a-14e corresponds to a respective container 30, and given that each one of the trays 13a-13e and 14a-14e can be controlled independently, the speed of vibration of one or more of the trays 13a-13e and 14a-14e can be adjusted in the case that its associated container 30 is being filled too rapidly or too slowly.

More specifically, given that there is one guiding tray 13a-13e and one vibration tray 14a-14e for each container 30 that is being filled, each of the guiding trays 13a-13e and the vibration trays 14a-14e can be controlled independently. As such, each one of the guiding trays 13a-13e and vibration trays 14a-14e can vibrate at a different frequency, for example. This independent control of the guiding trays 13a-13e and the vibration trays 14a-14e enables the container filling machine 10 to have better control over the number of discrete articles that are supplied to each container 30.

All or part of the functionality of the guiding trays 13a, vibration trays 14a-14e, spacing devices 46, sensing device 18, rejection device 20, counting device 22 and path blocking devices 24 may be implemented as software consisting of a series of instructions for execution by a processing unit. For example, the series of instructions could be stored in a memory, which could be a medium which is fixed, tangible and readable directly by the processing unit (e.g., removable diskette, RAM, flash memory, CD-ROM, ROM, PROM, EEPROM or fixed disk).

The manner in which the functionality of the guiding trays 13a-13e and the vibration trays 14a-14e is controlled, will now be described in more detail below.

In operation, the processing unit may access program instructions and data contained in a memory for issuing control signals to the drive units 56 and 57 positioned beneath each of the guiding trays 13a-13e and the vibration trays 14a-14e for setting the frequency of vibration of the guiding trays 13a-13e and the vibration trays 14a-14e. This may be done solely on the basis of the program instructions and data stored in a memory, or the processing unit may set the frequency of vibration on the basis of information specified by an operator via user inputs. The processing unit is in communication with the drive units 56 and 57 positioned beneath each of the guiding trays 13a-13e and the vibration trays 14a-14e in order to operate the drive units 56 for causing vibration of the vibration trays 14a-14e.

Once the initial frequency of vibration of each of the guiding trays 13a-13e and vibration trays 14a-14e has been set (via the drive units 56, 57), the processing unit can then cause adjustment of the frequency of vibration of each individual one of the guiding trays 13a-13e and the vibration trays 14a-14e on the basis of the rate at which each of the respective containers 30 is being filled. The manner in which the processing unit controls the frequency of vibration of the guiding trays 13a-13e and the vibration trays 14a-14e will now be described in more detail with respect to the flow chart shown in FIG. 6.

Figure 6:
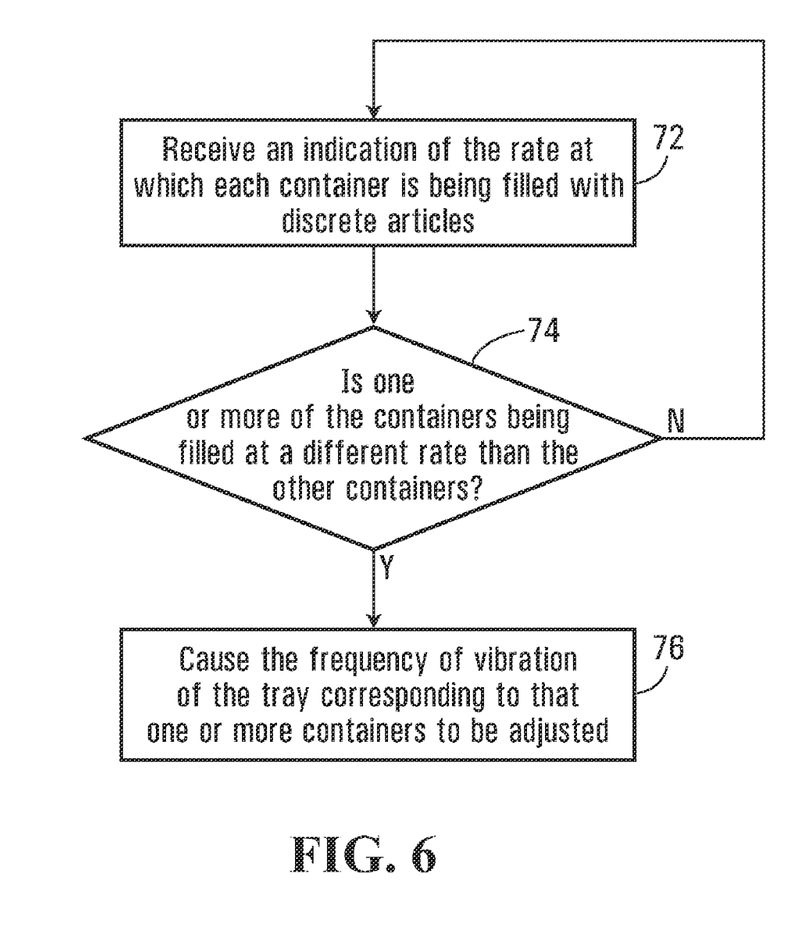
FIG. 6 shows a non-limiting example of a flow chart for adjusting the frequency of vibration of a vibration tray.

Firstly, at step 72 the processing unit receives an indication of the rate at which each container 30 is being filled with discrete articles. This step can be done in a variety of different manners. For example, in accordance with a first non-limiting example, the processing unit can receive an indication from the counting device 22 of the number of discrete articles travelling along each of the respective guiding paths 16 and passing through the counting device 22. The counting device 22 includes circuitry along each guiding path 16 for detecting when a discrete article passes there along. The counting device 22 thus detects and counts the discrete articles travelling along each guiding path 16 and provides this information to the processing unit.

As such, on the basis of the number of discrete articles, and the time period in which those discrete articles travel through the counting device 22, the processing unit can determine the rate at which each container 30 is being filled. It should be appreciated that the information from the counting device 22 indicative of the number of discrete articles can be provided on a continuous basis in substantially real time, or the counting device 22 can provide the information indicative of the number of discrete articles to the processing unit at predetermined time intervals.

In accordance with a second non-limiting embodiment, the processing unit can receive an indication of the rate at which each container is being filled based on weight readings associated with each container. In such an embodiment, the container filling machine 10 is in communication with a plurality of scales (or other weight measuring devices) that are positioned respectively beneath each of the containers 30 that are being filled. In this manner, based on the rate at which the weight of each container 30 increases, the processing unit can determine the rate at which the containers 30 are being filled.

At step 74, on the basis of the information indicative of the rate at which each container is being filled, the processing unit determines whether one or more of the containers 30 is being filled at a different rate (whether faster or slower) than the other containers 30. In order to have the filling of the containers occur at approximately the same time, it is desirable to have the rate at which the containers are being filled to be substantially the same.

The manner in which the processing unit determines whether one of the containers 30 is being filled at a different rate than the other containers can be done in a variety of different manners. For example, this determination can be made by comparing the rates at which the individual ones of the containers 30 are being filled. The comparison may be made based on the absolute rate of each container, or the comparison may be made based on an average rate, mean rate or median rate at which the containers 30 are being filled. In yet a further example, the comparison may be made against a range of predetermined rates that are pre-programmed into the memory of a computing unit. These predetermined rates may be programmed into the memory by a manufacturer of the container-filling machine 10, or alternatively, these predetermined rates may be entered into the memory by an operator of the machine via user inputs. In this manner, an operator of the machine can determine a range of rates at which the container-filling machine 10 should fill the containers 30. As such, if the rate at which one or more of the containers 30 is being filled falls outside of the pre-determined range, then the processing unit will determine that that container is being filled at a different rate than the other containers 30.

When the containers are all being filled at substantially the same rate as the other containers, the process loops between steps 72 and 74 of receiving information indicative of the rate at which the containers are being filled, and performing the determination described above. However, in the case where the processing unit determines that one or more of the containers is being filled at a different rate than the other containers, then the processing unit proceeds to step 76. At step 76, the processing unit causes adjustment of the frequency of vibration of one or both of the guiding tray and the vibration tray corresponding to the container that is being filled at a different rate than the other containers 30. The frequency of vibration of the guiding trays 13a-13e and the vibration trays 14a-14e can be adjusted by controlling the drive units 56, 57 positioned below the respective guiding trays 13a-13e and vibration trays 14a-14e.

As such, if the container that is being filled at a different rate is being filled more slowly than the other containers 30, then the processing unit can cause an increase in the frequency of vibration of the guiding tray and the vibration tray associated with that container. As such, that guiding tray and the vibration tray will then supply the discrete articles to the container at a faster rate. However, if the container that is being filled at a different rate is being filled more quickly than the other containers 30, then the processing unit can decrease the frequency of vibration (or stop the vibration altogether) of the guiding tray and vibration tray associated with that container. As such, the guiding tray and the vibration tray supplying discrete articles to that container will do so at a slower rate. In this manner, the processing unit is able to manage the rates at which the containers 30 are being filled, such that they can all be filled at substantially the same rate.

For the sake of example, let us assume that the container 30 that corresponds to guiding tray 13b and vibration tray 14b is being filled at a slower rate than the other containers 30. In such an embodiment, upon detection that that container 30 is being filled at a slower rate than the other containers 30, the processing unit will issue a control signal to each of the drive units 57 and 56 that are positioned beneath guiding tray 13b and vibration tray 14b such that the frequency of vibration of both the guiding tray 13b and the vibration tray 14b increases.

Now let us assume that the container 30 that corresponds to guiding tray 13b and vibration tray 14b is being filled at a faster rate than the other containers 30. In such an embodiment, upon detection that that container 30 is being filled at a faster rate than the other containers 30, the processing unit will issue a control signal to each of the drive units 57 and 56 that are positioned beneath guiding tray 13b and vibration tray 14b such that the frequency of vibration of both the guiding tray 13b and the vibration tray 14b decreases. In some embodiments, it may be desirable to stop the vibration of the guiding tray 13b completely, such that no more discrete articles are supplied to the vibration tray 14b. In this manner, the container filling machine 10 can quickly slow down the rate at which the discrete articles are being supplied to that container.

It should be noted that the control of both of the guiding trays 13a-13e and the vibration trays 14a-14b should be taken into consideration when trying to increase or decrease the rate at which the containers are being filled. For example, if it is desirable to decrease the rate at which the container 30 that corresponds to guiding tray 13b and vibration tray 14b is filled, it is not sufficient to simply decrease the frequency of vibration of the vibration tray 14b. This will simply cause discrete articles to pile up within vibration tray 14b since the rate at which discrete articles from guiding tray 13b are being supplied to the vibration tray 14b does not change.

The manner in which the functionality of the spacing devices 46 is controlled, will now be described in more detail below with respect to FIG. 7. For the purpose of this explanation, it will be assumed that there are five different motors 64 that are attached to five different driving shafts 60, that each correspond to a respective one of the vibration trays 14a-14e.

In operation, the processing unit may access program instructions and data contained in a memory for issuing control signals to the motors 64 that are responsible for supplying the rotational motion to the driving shafts 60. This may be done solely on the basis of program instructions and data stored in a memory, or the processing unit may set the speed of rotation on the basis of information specified by an operator via user inputs. The processing unit is in communication with the motors 64 in order cause the motors 64 to apply rotational motion to the driving shafts 60.

Once the initial speed of rotation of the driving shafts 60 has been set (via the motors 64), the processing unit can then cause adjustment of the speed of rotation of each individual one of the driving shafts 60 associated with the different vibration trays 14a-14e on the basis of the rate at which each of the respective containers 30 is being filled. The manner in which the processing unit controls the speed of rotation of the driving shafts 60 will now be described in more detail with respect to the flow chart shown in FIG. 7.

Firstly, at step 82 the processing unit receives an indication of the rate at which each container 30 is being filled with discrete articles. This step can be done in a variety of different manners, as described above with respect to step 72 of FIG. 6.

At step 84, on the basis of the information indicative of the rate at which each container is being filled, the processing unit determines whether one or more of the containers 30 is being filled at a different rate (whether faster or slower) than the other containers 30. In order to have the filling of the containers occur at approximately the same time, it is desirable to have the rate at which the containers are being filled to be substantially the same.

The manner in which the processing unit determines whether one of the containers 30 is being filled at a different rate than the other containers can be done in a variety of different manners, as described above with respect to step 74 of FIG. 6.

When the containers are all being filled at substantially the same rate as the other containers, the process loops between steps 82 and 84 of receiving information indicative of the rate at which the containers are being filled, and performing the determination described above. However, in the case where the processing unit determines that one or more of the containers is being filled at a different rate than the other containers, then the processing unit proceeds to step 86. At step 86, the processing unit causes adjustment of the speed of rotation of one or more of the driving shafts 60 corresponding to the container that is being filled at a different rate than the other containers 30. The speed of rotation of the driving shafts 60 can be adjusted by controlling the motors 64 attached to those driving shafts 60.

As such, if a container is being filled more slowly than the other containers 30, then the processing unit can cause an increase in the speed of rotation of the driving shaft 60 associated with the vibration tray for that container. As such, the spacing devices 46 corresponding to that drive shaft 60 will then supply the discrete articles to the container at a faster rate. However, if the container that is being filled more quickly than the other containers 30, then the processing unit can decrease the speed of rotation of the driving shaft 60 associated with the vibration tray for that container. As such, the spacing devices 46 that supply discrete articles to that container will do so at a slower rate. In this manner, the processing unit is able to manage the rates at which the containers 30 are being filled, such that they can all be filled at substantially the same rate.

Keeping with the same example as described above, let us assume that the container 30 that corresponds to guiding tray 13b and vibration tray 14b is being filled at a slower rate than the other containers 30. In such an embodiment, upon detection that that container 30 is being filled at a slower rate than the other containers 30, the processing unit will issue a control signal to the motor 64 that controls the speed of rotation of the driving shaft 60 of the spacing devices 46 positioned beneath the vibration tray 14b such that the speed of rotation of the belts 48 of those spacing devices 46 increases.

Now let us assume that the container 30 that corresponds to guiding tray 13b and vibration tray 14b is being filled at a faster rate than the other containers 30. In such an embodiment, upon detection that that container 30 is being filled at a faster rate than the other containers 30, the processing unit will issue a control signal to the motor 64 that controls the speed of rotation of the driving shaft 60 of the spacing devices 46 positioned beneath guiding tray 13b and vibration tray 14b such that the speed of rotation of the belts 48 of those spacing devices 46 decreases.

Figure 7:
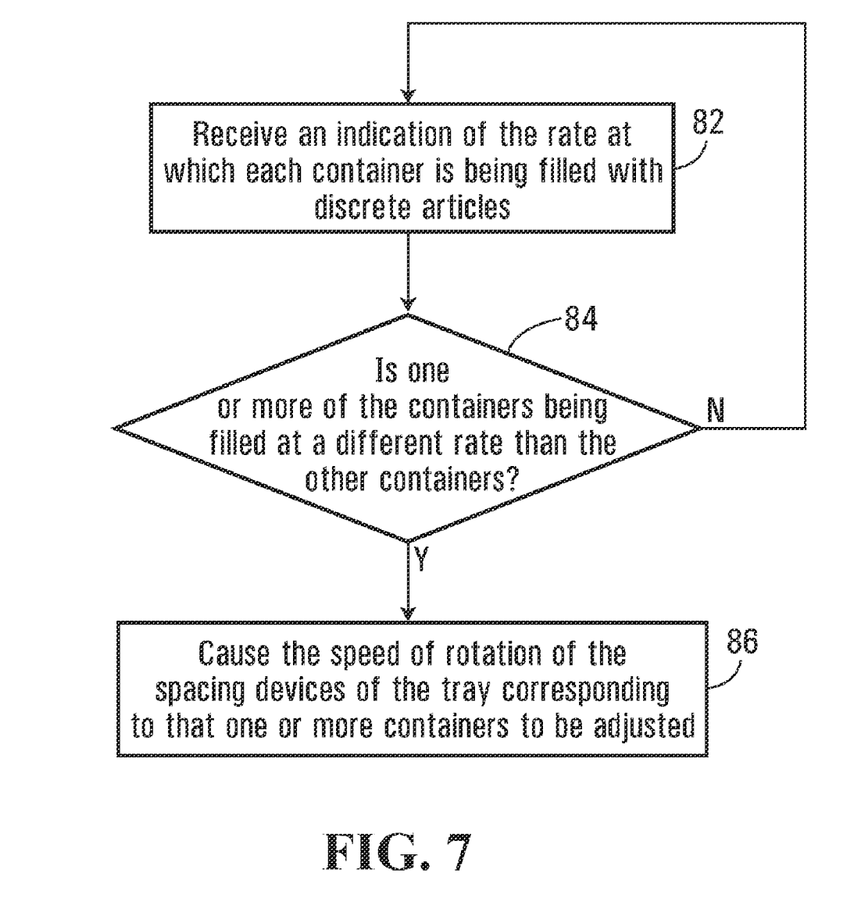
FIG. 7 shows a non-limiting example of a flow chart for adjusting the speed of rotation of the spacing devices.

It should be further appreciated that the processing unit may perform the process of FIG. 6 and the process of FIG. 7 simultaneously in a manner that takes into consideration both the frequency of vibration of a given vibration tray 14a-14e and the speed of rotation of the driving shafts 60 associated with that vibration tray 14a-14e. For example, in the case where one of the containers is being filled more slowly than the other containers, it is possible that the processing unit will adjust both the frequency of vibration of the vibration tray corresponding to that container, as well as the speed of rotation of the spacing devices 46 corresponding to that container.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A system for use in a container filling machine, said system comprising:
   a. a vibration tray comprising a plurality of channels along which discrete articles are able to move from a discrete article receiving end of the vibration tray towards a discrete article drop-off end of the vibration tray;
   b. a plurality of spacing devices, each spacing device in the plurality of spacing devices being associated with a respective one of the plurality of channels, the plurality of spacing devices being located in proximity to said discrete article drop-off end of the vibration tray, said plurality of spacing devices being operative for receiving discrete articles from said vibration tray at a first speed, and causing the discrete articles to be deposited from the vibration tray at a second speed, the second speed being greater than the first speed.

2. A system as defined in claim 1, wherein the plurality of channels each comprise side walls for guiding the discrete articles, the side walls of each respective channel extending along at least a portion of an associated one of the plurality of spacing devices.

3. A system as defined in claim 1, wherein each of said plurality of channels forms a V-shaped channel.

4. A system as defined in claim 3, wherein each of said plurality of channels comprises a slot for receiving a respective one of said plurality of spacing devices.

5. A system as defined in claim 1, wherein each of said plurality of spacing devices comprises a belt capable of carrying the discrete articles at the second speed.

6. A system as defined in claim 5, wherein said belt is mounted around a driving shaft and a driven shaft.

7. A system as defined in claim 1, wherein each of said plurality of spacing devices comprises a wheel capable of carrying the discrete articles at the second speed.

8. A system as defined in claim 1, wherein said second speed is between 150-600 rpm.

9. A container filling machine, comprising:
   a. a vibration tray comprising a plurality of channels along which discrete articles are able to move from a discrete article receiving end of the vibration tray towards a plurality of guiding paths that lead towards a container, wherein each channel in the plurality of channels comprises side walls for guiding the discrete articles towards the guiding paths;

b. a plurality of spacing devices located in proximity to said vibration tray, wherein the side walls of each respective channel extend along at least a portion of a respective one of the plurality of spacing devices, said plurality of spacing devices being operative for receiving the discrete articles from said vibration tray at a first speed, and causing the discrete articles to be deposited into the plurality of guiding paths at a second speed, the second speed being greater than the first speed.

10. A container filling machine as defined in claim 9, wherein each of said plurality of spacing devices comprises a wheel capable of carrying the discrete articles at the second speed.

11. A container filling machine as defined in claim 9, wherein each of said plurality of channels forms a V-shaped channel.

12. A container filling machine as defined in claim 11, wherein each of said plurality of channels comprises a slot for receiving a respective one of said plurality of spacing devices.

13. A container filling machine as defined in claim 9, wherein each of said plurality of spacing devices comprises a belt capable of carrying the discrete articles at the second speed.

14. A container filling machine as defined in claim 13, wherein the belt is mounted around a driving shaft and a driven shaft.

15. A method for filling containers with discrete articles, said method comprising:
  a. causing rotational motion to be provided to a first spacing device for moving discrete articles from a first vibration tray to a first set of guiding paths that lead to a first container;
  b. causing rotational motion to be provided to a second spacing device for moving discrete articles from a second vibration tray to a second set of guiding paths that lead to a second container;
  c. receiving an indication that the first container and the second container are being filled with the discrete articles at different rates;
  d. causing an adjustment in the rotational motion provided to one of the first spacing device and the second spacing device.

16. A method as defined in claim 15, wherein the first spacing device is one of a plurality of first spacing devices for moving discrete articles from the first vibration tray to the first set of guiding paths, and the second spacing device is one of a plurality of second spacing devices for moving discrete articles from the second vibration tray to the second set of guiding paths, each of the first spacing devices and the second spacing devices comprising a belt for moving the discrete articles.

17. A method as defined in claim 16, wherein the first vibration tray comprises a first plurality of channels, each of the first plurality of channels comprising a slot for receiving a respective one of said first spacing devices.

18. A method as defined in claim 16, wherein the second vibration tray comprises a second plurality of channels, each of the second plurality of channels comprising a slot for receiving a respective one of said second spacing devices.

* * * * *